April 2, 1935.　　　　C. B. MAPES　　　　1,996,163

SAW SHARPENING MACHINE

Filed Sept. 18, 1933　　　4 Sheets-Sheet 1

Inventor
C. B. MAPES.
By David O. Barnell
Attorney

April 2, 1935.   C. B. MAPES   1,996,163
SAW SHARPENING MACHINE
Filed Sept. 18, 1933   4 Sheets-Sheet 2
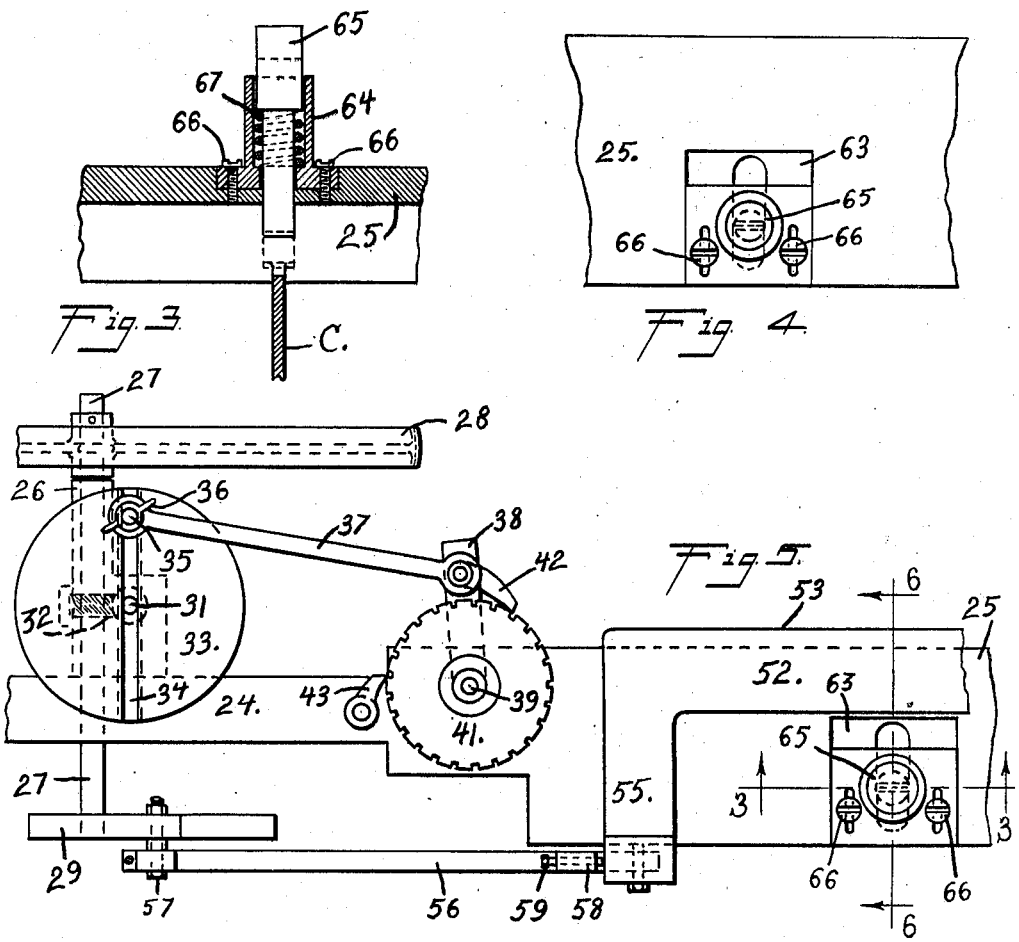
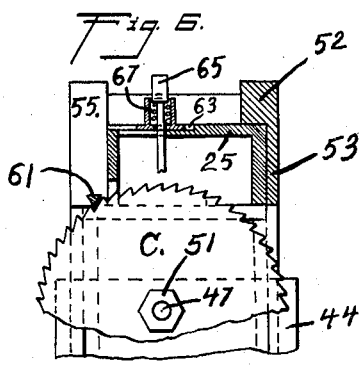
Inventor
C. B. MAPES.
By David O. Barnell
Attorney April 2, 1935. C. B. MAPES 1,996,163
SAW SHARPENING MACHINE
Filed Sept. 18, 1933 4 Sheets-Sheet 3
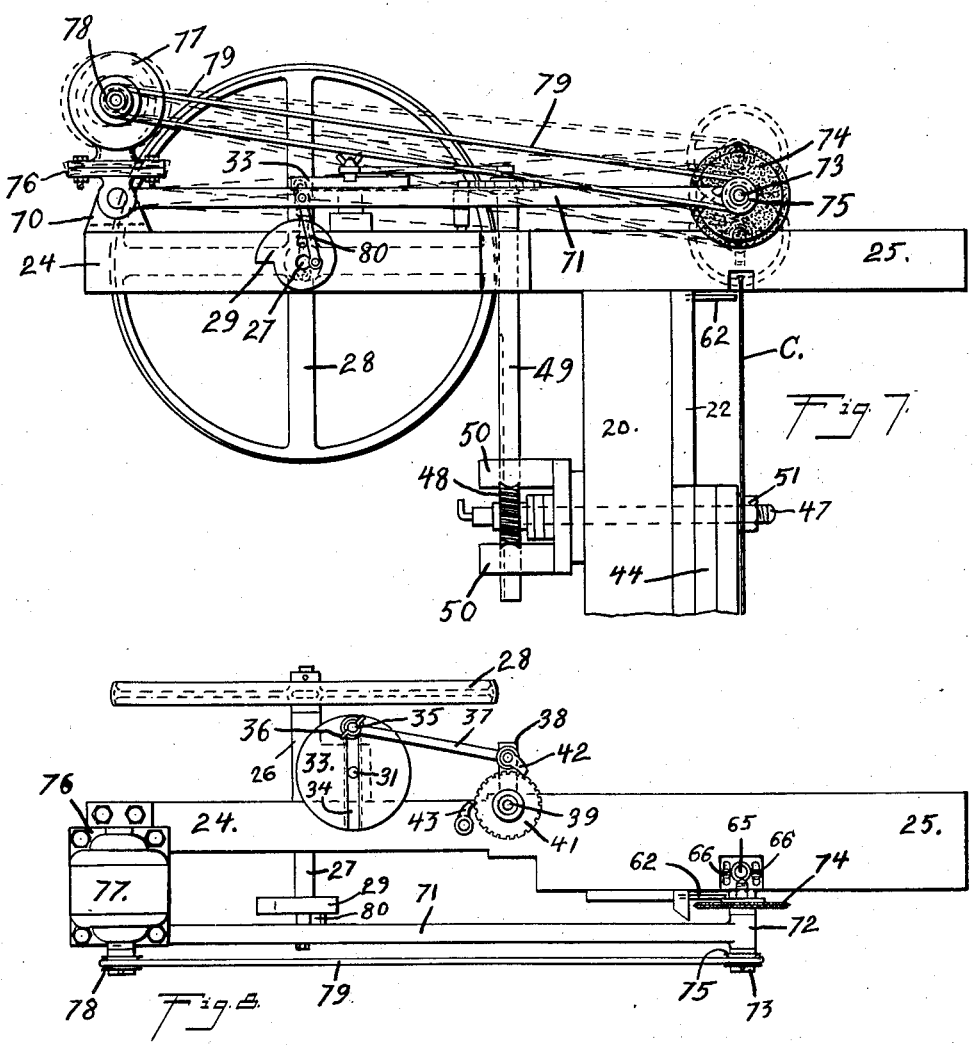
Inventor
C. B. MAPES.
By David C. Barnell
Attorney April 2, 1935. C. B. MAPES 1,996,163
SAW SHARPENING MACHINE
Filed Sept. 18, 1933 4 Sheets-Sheet 4
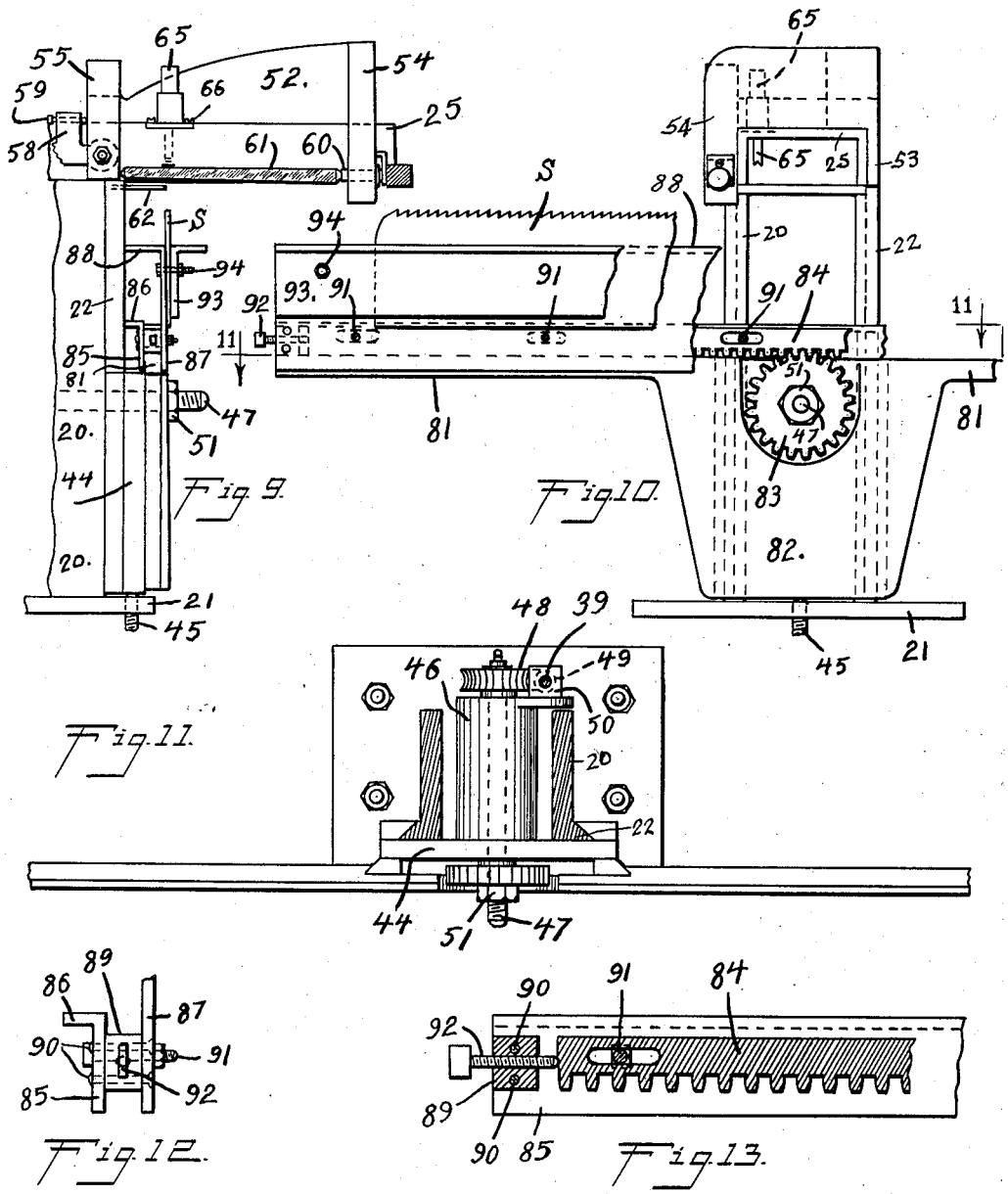

Patented Apr. 2, 1935

1,996,163

UNITED STATES PATENT OFFICE 1,996,163

SAW SHARPENING MACHINE

Christian B. Mapes, Omaha, Nebr.

Application September 18, 1933, Serial No. 689,828

2 Claims. (Cl. 76—34)

My invention relates to machines for sharpening saws. It is the object of my invention to provide a simple, inexpensive and automatically operating machine for sharpening saws, adapted for use with either circular or straight saws, and adaptable also for sharpening saws by filing or grinding, and for swage-setting the teeth thereof. More particular objects of my invention are to provide means for holding the saw to be sharpened, and means for intermittently advancing the holding means to present the teeth of the saw successively to the sharpening devices; to provide reciprocating file-holding means, and means for lifting the reciprocating file-holding means during the strokes thereof in one direction and while the saw is advanced to present another tooth thereof in position for engagement with the file; to provide a grinding-wheel and means for operating the same in conjunction with the saw-holding and feeding means; to provide a saw-tooth-swaging device and means for operating the same in conjunction with the saw-holding and sharpening means; and to provide means for adjusting the saw-holding means in relation to the sharpening devices, to accommodate saws of different diameter or width, and to vary the depth to which the saw-teeth will be engaged by the sharpening devices.

Figure 1:
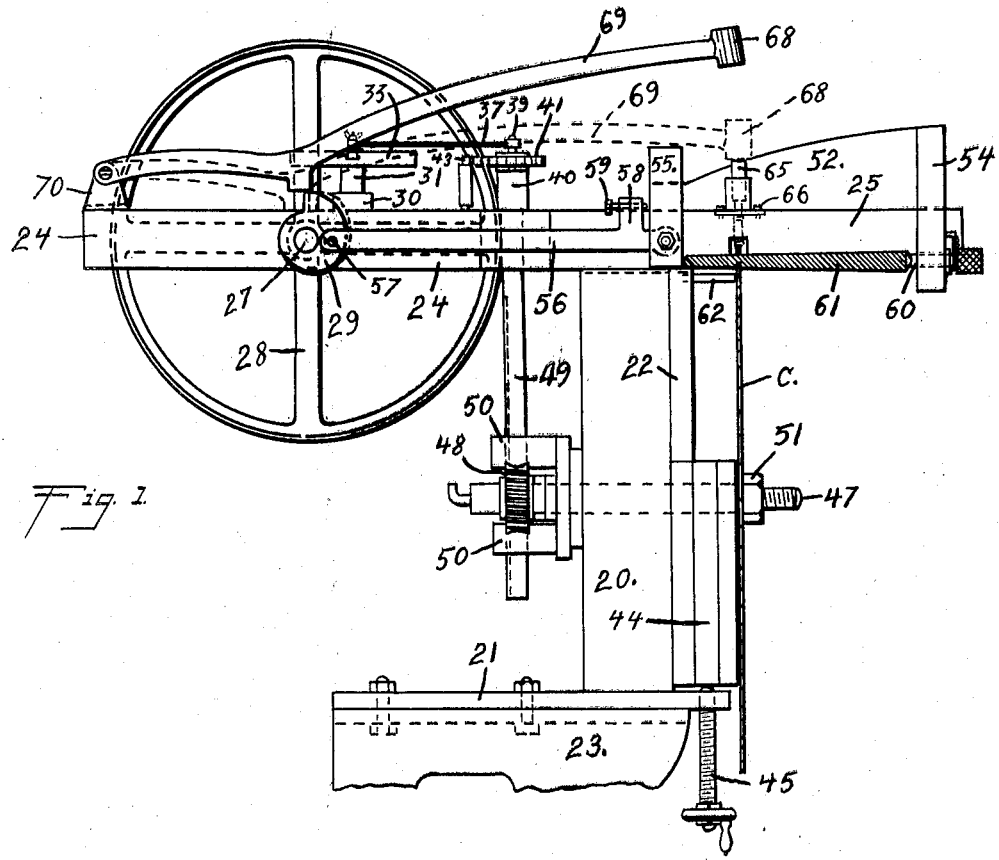
Figure 2:
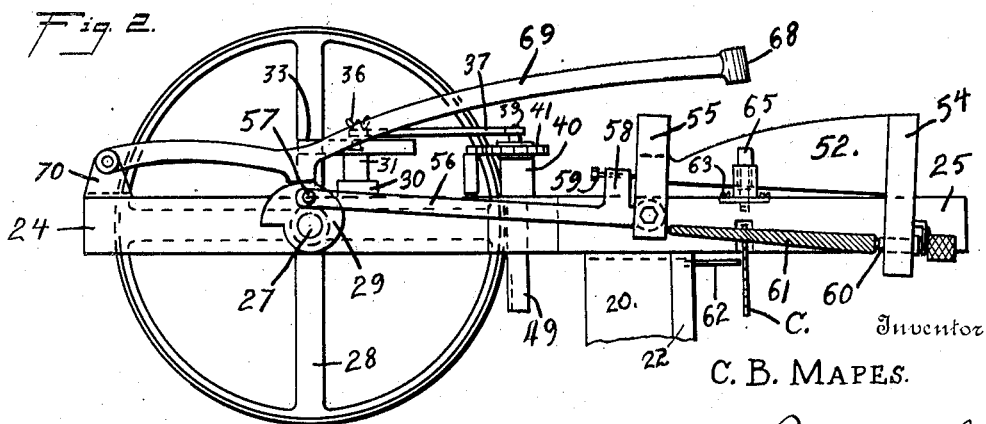

In the accompanying drawings, Fig. 1 is a side elevation of a machine embodying my invention, Fig. 2 is a partial side view of the same, showing parts in different operating positions, Fig. 3 is a detail longitudinal vertical section of the swaging device, the section being on the line 3—3 of Fig. 5, Fig. 4 is a detail plan view of the swaging device only, Fig. 5 is a partial plan view of the machine, Fig. 6 is a vertical transverse section on the line 6—6 of Fig. 5, Fig. 7 is a side elevation of the machine as equipped for sharpening a saw by grinding, Fig. 8 is a plan view of the same, Fig. 9 is a partial side elevation showing the carrier and feed devices for straight saws, Fig. 10 is a partial front view of the same, Fig. 11 is a detail horizontal section on the line 11—11 of Fig. 10, Fig. 12 is a detail end view of a part of the straight-saw carrier, and Fig. 13 is a partial longitudinal section of the same.

In carrying out my invention according to the illustrated embodiment thereof, I provide a rigid frame comprising an open rectangular column 20, having a foot-plate 21 secured upon a suitable base 23, and having on the edges at the front side thereof vertical V-guides 22. On the upper end of the column 20 is secured a horizontal top-member or table having a portion 24 extending rearwardly from the column, and a portion 25 extending forwardly therefrom. The rear portion 24 of the table has a laterally extending bearing 26 for the horizontal main drive-shaft 27 which extends transversely through the table, said shaft carrying at one end thereof a drive-pulley 28, and at the other end carrying the combined cam and crank-disk 29. At one side of and affixed to the bearing 26 is a bearing 30 for a short vertical shaft 31, and said shaft is driven from the shaft 27 by means of suitable spiral gears 32 inclosed within the bearings and indicated by dotted lines in Fig. 5. On the upper end of the shaft 31 is mounted a disk 33 having a diametral T-slot 34 extending across the upper face thereof. A bolt 35 has a head portion disposed slidably in the T-slot and is provided at the upper end with a wing-nut 36 which is employed to clamp the bolt at adjusted positions along the T-slot, whereby the bolt forms a crank-pin of which the throw is variable according to the radius of travel to which the bolt is adjusted. A connecting-rod 37 has one end thereof engaged pivotally with the adjustable crank-pin formed by the bolt 35, and its other end is similarly engaged with an arm 38 mounted to swing horizontally about a vertical shaft 39 mounted to rotate in a bearing 40 on the table-portion 24 adjacent to the column 20. On said shaft 39 above the swinging arm 38 is secured a notched wheel 41 which is engaged by a pawl 42 on the arm 38, whereby said wheel and the shaft 39 are intermittently actuated during the swinging movements of said arm. A second pawl 43, mounted on the table 24, engages the notched wheel to prevent reverse motion thereof. Mounted slidably on the vertical V-guides 22 of the column 20 is a head-block 44, which is supported in vertically adjusted positions on said guides by means of a screw 45 extending through the foot-plate 21. Upon said head-block, and extending back through the column 20, is a bearing 46 for a horizontal shaft or mandrel 47, which carries on its rear end a worm-wheel 48. A worm 49, meshing with said worm-wheel and shown only by dotted lines in Fig. 11, is held between lugs 50 formed integrally with the bearing 46, and the lower portion of the shaft 39 passes slidably through said lugs 50 and the worm 49, the shaft and worm being connected by a suitable key affixed to the worm and fitting slidably in a longitudinal keyway in the shaft. The front end of the mandrel 47 is threaded and provided with a clamp-nut 51, and, in the use of the machine for sharpening circular saws, the saw C is placed directly upon the mandrel and secured by means of said clamp-nut. Rotation of the mandrel, to present the teeth of the saw successively to the action of the sharpening means, is effected by the intermittent advance of the notched wheel 41, of which the motion is communicated to the mandrel through the shaft 39, worm 49, and worm-wheel 48. The peripheral advance of the saw at each movement of the mandrel is controlled by varying the position of the crank-pin or bolt 35 in the T-slot 34 of the disk 33, whereby the stroke of the swinging arm 38 is varied, and the pawl 42 caused to advance the notched wheel 41 the required amount during the alternate strokes of the swinging arm.

Resting slidably upon the front portion 25 of the table, is a block 52 having at one side a longitudinal flange portion 53, and at the other side a front lug 54 and a rear lug 55, said flange portion and lugs straddling the table and fitting slidably against the opposite sides thereof. To the rear lug 55 of the sliding block is connected pivotally the front end of a connecting-rod 56, and the rear end of said rod is connected with a crank-pin 57 on the disk 29. Near the front end of the connecting-rod 56 is an upwardly extending lug 58 having therein a threaded opening extending longitudinally of the rod, and in said threaded opening is disposed a screw 59 of which the front end is adapted to engage the rear side of the lug 55 during a portion of the movement of the connecting-rod. During rotation of the drive-shaft 27 and crank-disk 29, the connecting-rod 56 imparts longitudinal reciprocating movements to the block 52, and during the rearward strokes of the block the same rests horizontally upon the table, while the crank-pin 57 traverses the lower half of its circular path. The screw 59 is so adjusted that, at approximately the moment the crank-pin 57 passes the rear dead-center, the end of said screw 59 engages the lug 55 and prevents further upward swinging movement of the rod 56 relative to said lug. In consequence thereof, during the travel of the crank-pin around the upper portion of its circular path, the rear portion of the block 52 is lifted, as shown in Fig. 2, so that only the forward edge of said block rests upon the table during the forward stroke of the block. At the conclusion of the forward stroke, or approximately as the crank-pin reaches the forward dead-center, the block 52 is lowered to its horizontal position, in which it slides upon the table during the rearward stroke. Actuation of the mandrel 47 by the described feed devices is timed to occur during the forward strokes of the block 52, while the rear portion thereof is lifted from the table. A screw 60 extends horizontally through the front lug 54 of the table, and the rear end of said screw is hollowed to receive the pointed end of a file 61. The rear end of the file is also pointed and enters a recess in the rear lug 55, in which it is held by longitudinal pressure from said screw 60. The file 61 is positioned to enter the notches between the teeth of the saw C as the same are presented successively by the intermittent movements of the mandrel 47, the engagement of the file with the saw-teeth occurring during the rearward strokes of the block 52, and the file being lifted during the forward strokes, as the saw is advanced to present the next tooth in position for filing. A pin or stud 62 is extended forward from the column 20 to engage the rear side of the saw adjacent to the file and prevent chatter during the cutting strokes thereof, by supporting the saw against the rearward pressure of the file thereon. Saws of different diameter are disposed in operative relation to the file by raising or lowering the mandrel head-block 44 by means of the adjusting-screw 45, the worm 49 sliding upon the vertical shaft 39 to afford a driving connection between said shaft and the mandrel at any position of the head-block.

In front portion 25 of the table, intermediate the parts thereof traversed by the lugs 54 and 55 during reciprocation of the block 52, is a rectangular transverse channel 63 in which is slidably disposed the base of a tubular guide 64 for the swage-plunger 65, said guide being held in adjusted positions in said channel by screws 66 extending into the table through slots in said base. The plunger 65 is held normally in a raised position by means of a spring 67 disposed about the same within the guide, the upper end of the plunger projecting above the guide, and the lower portion extending down through the table, which has a transverse slot therein of such length as to register with the plunger at any adjusted position of the guide. By suitable adjustments in the position of the guide the lower portion of the plunger is disposed in operative relation with the teeth of the saw C, or so that the swaging-groove in the end of the plunger is in register with the points of the saw-teeth during the pauses of the intermittent advance of the saw by the feed mechanism therefor. The plunger is actuated, to engage the saw-teeth and swage or widen the points thereof transversely of the blade, by means of a drop-hammer formed by a weight 68 carried at the front end of a lever 69 which is pivoted on a lug 70 extending up from the rear end of the table-portion 24. An intermediate portion of the lever 69 engages the spiral cam-face of the disk 29, whereby during the rotation of the drive-shaft 27 the lever is intermittently raised as shown in Fig. 1, and then dropped so as to move by gravity to the position shown by dotted lines in Fig. 1, at which the weighted end or hammer 68 forcibly engages the upper end of the swage-plunger, the dropping of the hammer being timed, of course, to occur while the saw is stationary, and sufficiently in advance of a feed-movement thereof to enable the hammer to be partially raised and the plunger disengaged from the saw-tooth before an advance of the saw is commenced.

For use with saws which it is desirable to sharpen by grinding, the filing-block 52 and its connecting-rod 56 are removed from the machine, and the grinding device shown in Figs. 7 and 8 is substituted therefor. Said grinding device comprises an arm or lever 71 having its rear end connected pivotally with the lug 70 on the table, and having at its front end a bearing 72 for an arbor 73 which carries a grinding-wheel 74 at one end and a grooved pulley 75 at the other end. On the pivoted end of the arm 71 is a platform 76 on which is mounted a small electric motor 77 having a pulley 78 from which a belt 79 is extended to the pulley 75 on the arbor 73. The intermediate portion of the arm 71, above the disk 29, is connected with the crank-pin 57 by a short link or connecting-rod 80, whereby the arm 71 is oscillated in a vertical plane about its pivoted rear end, during rotation of the main drive shaft 27. The grinding-wheel 74 is positioned for engagement with the saw-teeth while the arm is in the lowered position, the wheel being driven continuously by the motor 77, and the periphery of the wheel being suitably formed to produce the desired shape of the teeth.

For use in sharpening straight saws, I provide a horizontal guide 81, having an intermediate downwardly extending plate portion 82 which is secured to the front face of the head-block 44 and is recessed about the mandrel 47 to afford space for a small spur-gear or pinion 83 which is secured upon the mandrel. Said pinion 83 meshes operatively with rack-teeth on the lower side of a bar 84, said bar comprising the intermediate member of a slide or carrier which straddles the upper portion of the horizontal guide 81 and is movable longitudinally thereon by rotation of the mandrel 47 and said pinion 83. The rear portion of the slide is formed by an angle-bar having a vertical flange 85 engaging the rear sides of the rack-bar and the guide 81, and a horizontal flange 86 extending rearward from the upper edge of said vertical flange and engaging slidably the front side of the column 20. The front portion of the slide is formed by an angle-bar having a vertical flange 87 engaging the front sides of the rack-bar and guide, and a horizontal flange 88 extending rearwardly above the flange 86 to similarly engage the column 20. At each end of the slide, a spacing-block 89 is disposed above the guide 81, between the vertical flanges 85 and 87 of the angle-bars, and secured to the latter by rivets 90. Said flanges 85 and 87 are also connected by bolts 91 extending through longitudinal slots in the rack-bar 84, and the latter is held in longitudinally adjusted relations to the angle-bars by means of adjusting-screws 92 extending through the blocks 89 and engaging the ends of the rack-bar, as best shown in Fig. 13. The upper portion of the angle-bar flange 87 forms the rear member of a saw-clamp, the front clamp-member being formed by an angle-bar 93 which is secured to said flange 87 by clamp-bolts 94 extending through the end portions of the bars. For sharpening a straight saw S, the blade thereof is inserted between the clamp-members 87 and 93, with the toothed edge of the blade upwards and extending horizontally, and the clamp-bolts 94 are tightened to secure the saw fixedly upon the slide. The position of the head-block 44 is then adjusted by means of the screw 45 to dispose the saw-teeth at the proper level for engagement with the file, or with the grinding-wheel if the same is employed in place of the file, and the screws 92 are employed if needed, to slightly vary the longitudinal relation of the rack-bar and slide, for disposing the saw-teeth in register with the sharpening means. The feed devices are adjusted as for use with circular saws, the intermittent rotational movements of the mandrel 47 being communicated by the pinion 83 to the rack-bar 84 by which the slide or carrier is successively advanced by amounts equal to the pitch of the saw-teeth.

Now, having described my invention, what I claim and desire to secure by Letters Patent is:

1. In a saw sharpening machine, a main frame having vertical guide portions and horizontal guide portions, a saw-holder mounted slidably on said vertical guide portion of the frame, means for retaining the saw-holder in vertically adjusted positions on said guide portion, a drive-shaft, means including slidably connected parts extending parallel with the vertical guide and connecting the drive-shaft and saw-holder for actuating the latter intermittently, a file-holder slidable upon the horizontal guide portion of the frame and straddling the same so as to be tiltable vertically thereon, the file-holder being adapted to hold a file in position for engaging a saw in the saw-holder, a crank connected with said drive-shaft, and a connecting-rod extending between said crank and file-holder and having a knee-joint connection with the latter, whereby the same is actuated reciprocatingly upon the horizontal guide portion and lifted to a tilted position for disengaging the file from the saw during the strokes in one direction.

2. In a saw-sharpening machine, a fixed frame, a drive-shaft journaled therein, a reciprocating sharpening means connected with said drive-shaft for actuation thereby, a saw-holder, a head-block carrying said saw-holder and movably mounted on the frame, adjusting means for moving said head-block to place the saw-holder in operative relation with the reciprocating sharpening means, rotary feeding means connected with the saw-holder and carried by the head-block, and actuating means connecting said feeding means and the drive-shaft, said actuating means including slidably connected members carried respectively by the frame and head-block.

CHRISTIAN B. MAPES.